Oct. 26, 1954     C. W. KEEGIN     2,692,960
VEHICLE INDICATING DEVICE
Filed Aug. 30, 1952
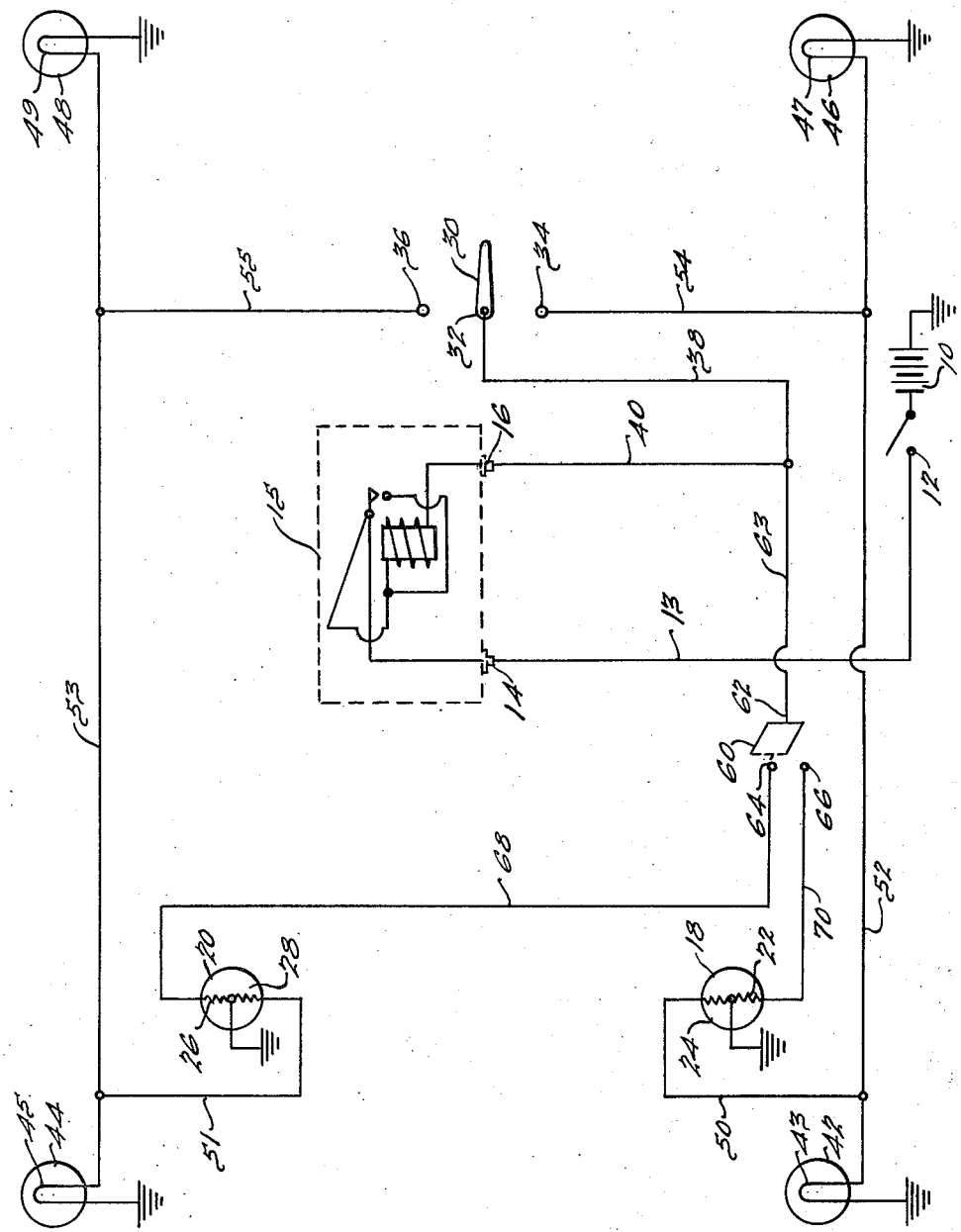
INVENTOR.
Curtis W. Keegin.
BY
Harness, Dickey & Pierce.
ATTORNEYS Patented Oct. 26, 1954

2,692,960

UNITED STATES PATENT OFFICE 2,692,960

VEHICLE INDICATING DEVICE

Curtis W. Keegin, Grosse Pointe, Mich.

Application August 30, 1952, Serial No. 307,277

4 Claims. (Cl. 315—80)

This invention relates to a signaling system and, more particularly, to a signaling system adapted for use on automotive vehicles to indicate a plurality of operating conditions of the vehicle.

An object of the invention is to provide an improved signaling system of the type above referred to which is simple in construction, relatively inexpensive, efficient and reliable in operation.

Another object of the invention is to provide a signaling arrangement which may be conveniently combined with an existing signaling system on a vehicle or added as an accessory thereto.

A feature of the invention resides in providing signal lamps having additional filaments which are lighted in response to operating conditions of the vehicle.

Other objects and advantages of the invention will be apparent from the following description thereof when read in conjunction with the accompanying drawing illustrating a circuit diagram of the invention as applied to the turn signaling system of a vehicle.

Referring to the drawing, a battery 10, one terminal of which is grounded to the frame of the vehicle (not shown), provides a suitable source of potential and is in circuit with an ignition switch 12, a conductor 13, and terminal 14 of flasher unit 15. Flasher unit 15 may be of the type disclosed in United States Letters Patent No. 1,979,349 to Schmidinger and reference may be had thereto for a description of its operation.

A pair of signal lamps 18 and 20 are mounted in any suitable position within the view of the operator and each signal lamp is provided with a pair of interconnected filaments 22, 24, and 26, 28, respectively, which have a ground connection at the junction point. A turn signal switch 30 having terminals 32, 34, and 36 is mounted in any suitable position before the operator of the vehicle, and terminal 32 is connected to terminal 16 of the flasher unit by conductors 38 and 40. Parking lamps 42 and 44 and tail lamps 46 and 48, which include filaments 43, 45, and 47, 49, each have one terminal of their respective filaments grounded to the frame. The parking lamps are located at the front of the vehicle on opposite sides thereof and the tail lamps are located at the rear of the vehicle on opposite sides thereof, such lamps being observable exteriorly of the vehicle.

Filaments 24, 43, and 47 are connected in a parallel circuit to terminal 34 of turn switch 30 by conductors 50, 52, and 54 while filaments 28, 45, and 49 are connected in a parallel circuit to terminal 36 of the turn switch by conductors 51, 53, and 55.

A normally open switch 60 has terminal 62 connected to terminal 16 of flasher unit 15 by conductors 63 and 40. Terminals 64 and 66 are connected by conductors 68 and 70 to filaments 26 and 22 of the signal lamps, respectively.

A brief description will now be given of the manner in which the invention operates, assuming that the switch 60 is mounted on the hand brake (not shown) of the vehicle so as to be closed when the hand brake is engaged. When the ignition switch 12 is closed, a circuit is completed from battery, along conductor 13, through terminals 14 and 16 of flasher unit 15, along conductors 40 and 63, and through switch 60, and a parallel circuit which includes conductors 68 and 70 and the filaments 22 and 26 of the pilot lamps 18 and 20, to ground, and both pilot lamps will flash concurrently to indicate that the hand brake is engaged. The operation of the flasher unit causes an audible noise which also serves to warn the operator that the hand brake is engaged.

After the hand brake is released, the operator may signal a turn by operating the turn switch 30. Assuming that a left turn signal is desired, the turn switch lever is moved to contact terminal 36 thereby completing a circuit from battery, through the ignition switch 12, conductor 13, terminals 14 and 16 of flasher unit 15, conductors 40 and 38 and the terminals 32 and 36 of the turn switch, to a parallel circuit which includes conductors 55, 53, and 51 and the filaments 28, 45, and 49, to ground, so that the pilot lamp 20 flashes in conjunction with the parking lamp 44 and the tail lamp 48. When a right turn indication is desired, the turn switch is moved to contact terminal 34 and a circuit is completed to the signal lamp 18, parking lamp 42, and tail lamp 46 in a manner similar to that described for the left turn indication.

It is to be understood that the above described arrangement is illustrative of the application of the principles of the invention. Numerous other arrangements may be devised by those skilled in the art without departing from the spirit and scope of the invention. For example, the invention could be applied to the bright headlight signal lamp instead of the turn signal lamps. It will also be apparent that signals may be given to indicate other vehicle operating conditions. For example, the closing of the switch 60 could

What is claimed is:

1. A signal system for a vehicle having a grounded source of potential, said system comprising, in combination, a pair of exterior signal lamps each grounded at one terminal thereof, a pair of pilot lamps each having a filament grounded intermediate the terminals thereof, a flasher unit operatively connected to said source of potential, a normally open first switch having two selectively operable positions, means responsive to the closure of said first switch in one operable position for establishing parallel circuits from said flasher unit to ground through one of said exterior lamps and a portion of the filament of one of said pilot lamps to intermittently energize said one exterior lamp and said one pilot lamp, a normally open second switch, and means responsive to the closure of said second switch for establishing parallel circuits from said flasher unit to ground through the other portion of the filament of each of said pilot lamps to intermittently energize both of said pilot lamps.

2. A signal system for a vehicle having a grounded source of potential, said system comprising, in combination, a pair of exterior lamps each grounded at one terminal thereof, a pair of pilot lamps each having a pair of grounded filaments, a flasher unit operatively connected to said source of potential, a normally open first switch having two selectively operable positions, means responsive to the closure of said first switch in one operable position for establishing parallel circuits from said flasher unit to ground through one of said exterior lamps and one filament of one of said pilot lamps to intermittently energize said one exterior lamp and said one pilot lamp, a normally open second switch, and means responsive to the closure of said second switch for establishing parallel circuits from said flasher unit to ground through the other filaments of both of said pilot lamps to intermittently energize said pilot lamps simultaneously.

3. In a signal system for a motor vehicle provided with parking brake means and having a grounded source of potential, the combination comprising a pair of exterior lamps each having a filament grounded at one terminal thereof, a pair of pilot lamps each having a pair of interconnected filaments grounded at the junction point, a flasher unit operatively connected to said source of potential, a normally open turn switch having two selectively operable positions, means responsive to the closure of said turn switch in one operative position for establishing parallel circuits from said flasher unit through the filament of one of said exterior lamps and one filament of one of said pilot lamps to ground to intermittently energize said one exterior lamp and said one pilot lamp, means responsive to the closure of said turn switch in the other operative position for establishing parallel circuits from said flasher unit through the filament of the other exterior lamp and one filament of the other pilot lamp to ground to intermittently energize said other exterior lamp and said other pilot lamp, a normally open second switch actuatable by said parking brake means, and means responsive to the closure of said second switch for establishing parallel circuits from said flasher unit to ground through the other filaments of both of said pilot lamps to intermittently energize said pilot lamps simultaneously.

4. A signal system for a motor vehicle provided with parking brake means and having a grounded source of potential, said system comprising, in combination, a pair of front exterior lamps located on opposite sides of the vehicle and each having a filament grounded at one terminal thereof, a pair of rear exterior lamps located on opposite sides of the vehicle and each having a filament grounded at one terminal thereof, a pair of pilot lamps each having a pair of interconnected filaments grounded at the junction point, a flasher unit operatively connected to said source of potential, a normally open turn switch having two selectively operable positions, means responsive to the closure of said turn switch in one operative position for establishing parallel circuits from said flasher unit through the filament of one of said front exterior lamps, the filament of one of said rear exterior lamps, and one filament of one of said pilot lamps to ground to intermittently energize said one front exterior lamp, said one rear exterior lamp and said pilot lamp, a second normally open switch actuatable by said parking brake means, and means responsive to the closure of said second switch for establishing parallel circuits from said flasher unit through the other filaments of both of said pilot lamps to ground to intermittently energize said pilot lamps only.

References Cited in the file of this patent

UNITED STATES PATENTS

| Number | Name | Date |
|---|---|---|
| 2,086,959 | Rom | July 13, 1937 |
| 2,122,508 | Bell | July 5, 1938 |
| 2,172,068 | Murray | Sept. 5, 1939 |
| 2,238,394 | Murray, Jr. | Apr. 15, 1941 |

FOREIGN PATENTS

| Number | Country | Date |
|---|---|---|
| 864,271 | France | Jan. 13, 1941 |